United States Patent [19]
Wilkinson et al.

[11] 3,826,967
[45] July 30, 1974

[54] LOW LEAKAGE SECONDARY CIRCUIT FOR A POWER TRANSFORMER INCLUDING CONDUCTIVE STRIPS FORMING THE SECONDARY AND CONNECTIONS FOR RECTIFYING DIODES

[75] Inventors: Bruce L. Wilkinson, Torrance; Michael C. Stolowitz, Sherman Oaks, both of Calif.

[73] Assignee: Pioneer Magnetics, Inc., Santa Monica, Calif.

[22] Filed: May 29, 1973

[21] Appl. No.: 364,831

[52] U.S. Cl. ............... 321/8 R, 336/223, 336/232
[51] Int. Cl. .............................................. H02m 7/00
[58] Field of Search ........... 321/8, 47; 336/223, 232

[56] References Cited
UNITED STATES PATENTS

| | | | |
|---|---|---|---|
| 999,749 | 8/1911 | Chubb | 336/223 X |
| 1,160,357 | 11/1915 | Agnew | 336/223 X |
| 1,595,838 | 8/1926 | Turner | 336/232 X |
| 1,852,805 | 4/1932 | Frank | 336/223 |
| 2,882,507 | 4/1959 | Holz | 336/232 X |
| 3,395,317 | 7/1968 | Hanson | 321/10 X |

Primary Examiner—William M. Shoop, Jr.
Attorney, Agent, or Firm—Jessup & Beecher

[57] ABSTRACT

A low leakage, secondary circuit, structure is provided for the power transformer in a high frequency power inverter system, or the like. The secondary circuit includes mutually insulated conductive strips which are placed in close proximity to one another, and which form the secondary winding of the power transformer, and which also form connections between the secondary winding and rectifying diodes included in the secondary circuit is minimized, thereby to minimize the leakage reactance in the circuit.

5 Claims, 8 Drawing Figures

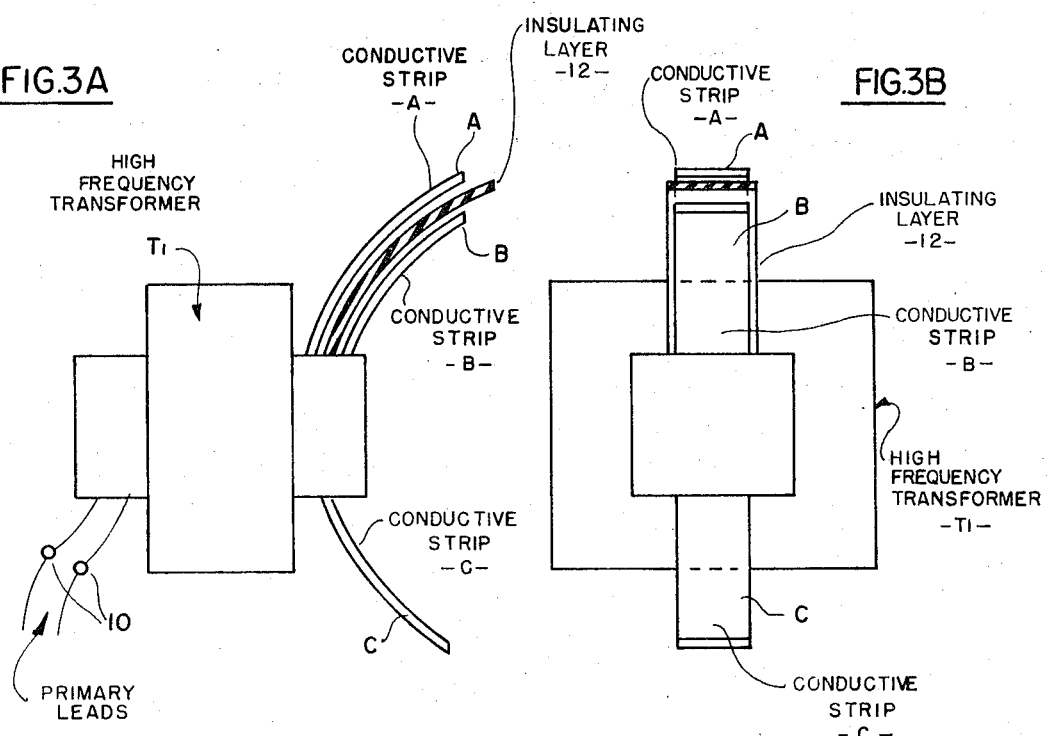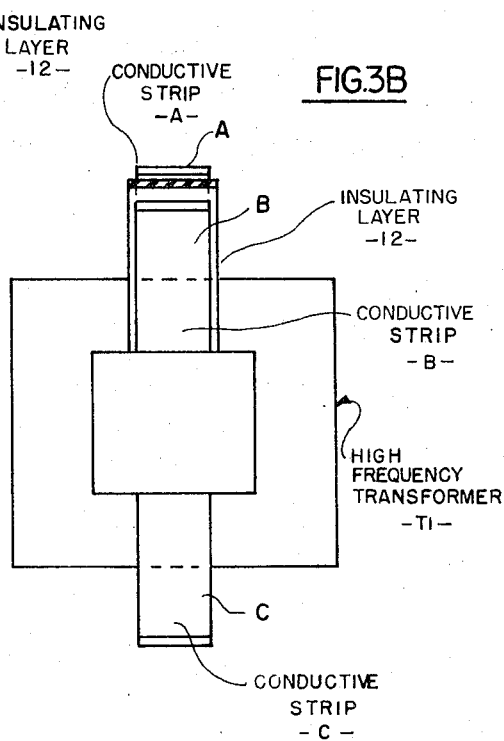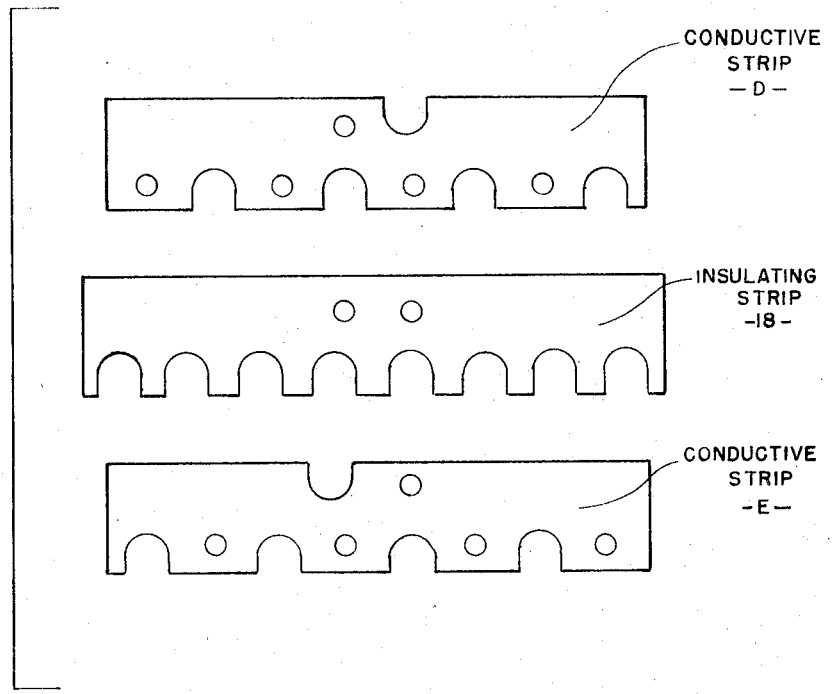

LOW LEAKAGE SECONDARY CIRCUIT FOR A POWER TRANSFORMER INCLUDING CONDUCTIVE STRIPS FORMING THE SECONDARY AND CONNECTIONS FOR RECTIFYING DIODES

BACKGROUND OF THE INVENTION

Difficulties are often encountered in the construction of high frequency power inverter systems, and the like, in that the secondary circuit of such an inverter system usually exhibits a high leakage reactance at the operational frequency of the system. The problem is especially troublesome in the case of low voltage, high current power inverters of the high frequency type, such as are in widespread present day use for computer power supplies.

For example, in the case of a power inverter system whose secondary circuit is intended to provide a 2-volt direct-current output at 200 amperes from a transformer operating at 20 kHz, only 0.1 microhenries of leakage reactance may result in a loss of 20 percent of output voltage. In addition to the loss of output voltage, the presence of leakage reactance in the secondary circuit of the inverter can cause serious difficulties in the primary circuit, such as voltage overshoots which can damage the switching transistors of the system.

The structure of the present invention provides a means for maintaining an extremely low leakage reactance in the secondary circuit of the power inverter system, and it is of particular advantage in a power inverter system which is intended to produce a low voltage and high direct-current output from a relatively high frequency source.

As described briefly above, the structure of the invention includes the formation of the secondary winding of the high frequency inverter transformer of a pair of electrically conductive strips which are insulated from one another; and which are positioned to be closely adjacent one another; and also the formation of the connections from the secondary winding to the diode rectifiers in the secondary circuit of such closely adjacent, mutually insulated, conductive strips, so as to minimize the area encompassed by the secondary circuit and, thereby, to minimize leakage reactance.

BRIEF DESCRIPTION OF THE DRAWINGS

FIGS. 3A and 3B are side and end elevational views, respectively, of a power transformer having a secondary construction of the form shown in FIG. 2;

FIG. 4 is a representation of three components which form the connections between the secondary of the transformer and the rectifyiing diodes of the secondary circuit;

DETAILED DESCRIPTION OF THE ILLUSTRATED EMBODIMENT

Figure 1:
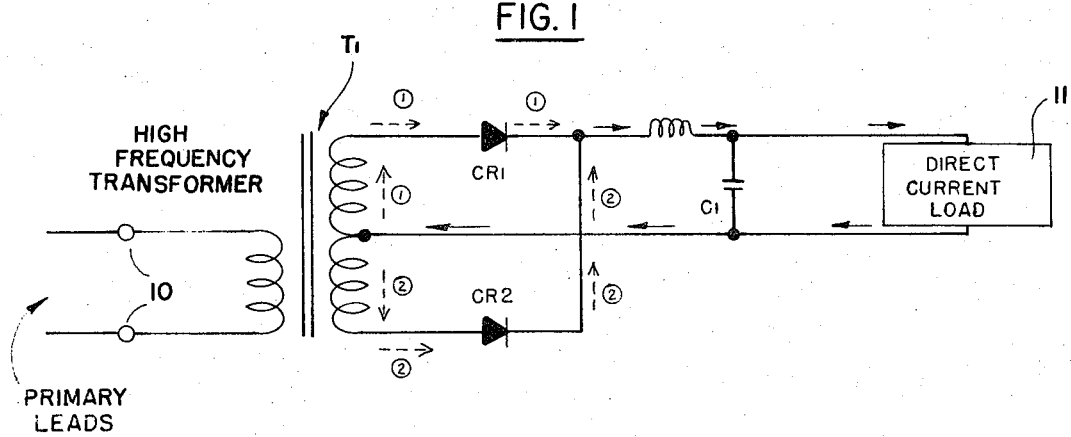
FIG. 1 is a circuit diagram of the secondary circuit of a typical high frequency inverter system, and to which the structure of the present invention may be applied.

The circuit shown in FIG. 1 is a part of a high frequency power inverter system, and it includes a usual high frequency power transformer $T_1$. The primary leads in the circuit are connected to a pair of input terminals 10 which, in turn, are connected to the primary winding of the transformer $T_1$. As is well known to the art, transistor switches, or the like, are incorporated into the primary circuit, so that power from a direct current source may be switched at a high frequency to create an alternating current flow in the primary winding of the transformer $T_1$.

The transformer $T_1$ includes a secondary winding connected to the anodes of a pair of rectifier diodes CR1 and CR2. The cathodes of the diodes are connected together and through a filter choke coil $L_1$ to one side of a direct current load 11. The center tap of the secondary winding is connected to the other side of the load. A filter output capacitor $C_1$ is connected across the output, as shown.

The solid line arrows drawn in the diagram show the direction of direct current flow, and the broken line arrows represent the pulsating current flow in the secondary circuit, that is, the flow of the half-wave rectified alternating current. During a normal operating cycle, the pulsating current flows alternately in the paths marked by the broken line arrows numbered 1, and then in the paths marked by the broken line arrows numbered 2. The sum of the pulsating currents is exactly equal to the direct current flow through the load.

Leakage reactance is caused in the secondary circuit of FIG. 1 by the existence of a magnetic path around the conductors carrying the pulsating currents. Therefore, if the circuit components can be constructed to minimize the area between the circuit paths designated by the arrows 1 and the circuit paths designated by the arrows 2, the leakage reactance in the circuit will be minimized. This is because the cross-sectional area of the magnetic path which can surround any individual one of these conductors, without also surrounding the other conductor, is minimized. The magnetic path which may surround both conductors is of no consequence since the sum of the currents in the two conductors is constant, and, the sum current does not pulsate to any appreciable extent.

Figure 2:
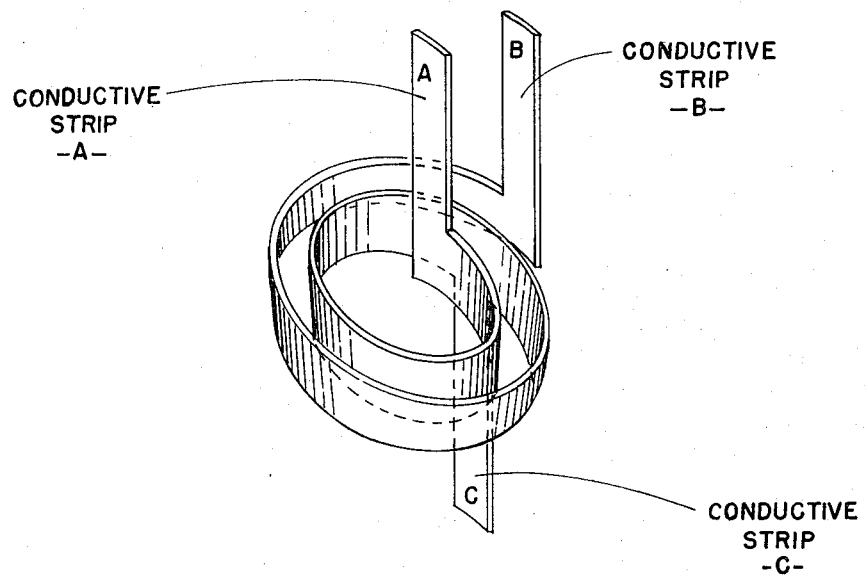
FIG. 2 is a perspective representation of a power transformer secondary winding constructed in accordance with the concepts of the invention.

In low voltage, high current, secondary circuits, the secondary transformer windings have, in the past been formed of a conductive strip, instead of the usual wire. In accordance with the present invention, and as shown in FIG. 2, the secondary winding of the power inverter transformer $T_1$ is formed of such a conductive strip 10 which, is composed of copper, or other appropriate electrically conductive material, and which is fabricated, for example, by punching or stamping. Although the coiled strip is shown in an open configuration in FIG. 2 for purposes of illustration, it will be understood that in practice the convolutions of the coil are closely wound on one another so that the various segments are adjacent to one another.

As will be described, an insulation backing is provided for the conductive strip, to prevent shortcircuiting. The construction is such that the extremities of the completed winding can be brought out as a laminated bus structure, and the purpose of the present invention is to maintain the laminated structure throughout the winding and throughout the rectifying portion of the secondary circuit.

The conductive strip 10 shown in FIG. 2 may be a copper stamping which may, for example, be one inch wide and 0.01 inch thick. The strip is coiled into a secondary winding, as shown in FIG. 2 and, in practice, a layer of insulating material 12 (FIGS. 3A and 3B) which may, for example, be 0.001 inch thick Mylar, or similar material, is affixed to one side of the strip, so that when the strip is coiled around the primary winding in the transformer $T_1$, the individual turns, and the legs of the conductive strip will be insulated from one another.

In the particular example of FIG. 2, the strip 10 forms a two-turn secondary winding having strip-like terminals A and B, and having a strip-like center tap C, all of which are insulated from one another. The resulting secondary winding has a minimum possible separation between the conductors forming the winding, typically about 0.001 inches, and it has the longest practical magnetic path length, corresponding to the width of the strip, which is, for example, approximately 1 inch, thus achieving extremely low leakage resistance.

A representation of the transformer $T_1$, modified in the manner described above, is shown in FIGS. 3A and 3B. The conductive strip C forming the center tap connection to the transformer extends from one side of the secondary, whereas the conductive strips A and B forming the terminals to the secondary extend from the other side, the latter strips being separated by the thin insulating layer 12. The low leakage reactance in the secondary is preserved by connecting the terminals A and B to the rectifying diodes CR1 and CR2 through a bus assembly of the same configuration. The components of the bus assembly are shown in FIG. 4, and they include a pair of conductive strips D and E separated by an insulating strip 18.

It should be noted at this point that the structure of the invention is being described in conjunction with a specific type secondary circuit. It is obvious that the secondary winding could include more than two turns, and that the concept can be applied equally well to a winding without a center tap. Also, the conductive strips forming the structure of the invention may be formed of stamped copper pieces, as described above, but may equally well be formed by other means. Each conductive strip may, for example, consist of a lamination of thin conductive strips separated by a thin layer of insulating material, so as to reduce eddy current loss. Various types of conductive material may be used to form the conductive strips, such as copper, aluminum, or other appropriate material.

Although two rectifying diodes CR1 and CR2 are shown in FIG. 1, it is common in low voltage high current circuits to use a plurality of rectifier diodes to share the large current load. For example, each of the diodes CR1 and CR2 may actually comprise four diodes connected in parallel, such as designated CR1A, CR1B, CR1C, CR1D and CR2A, CR2B, CR2C and CR2D in FIGS. 5 and 6. It is noted that the cathodes of the diodes in FIG. 1 are connected together, and such a common connection is conveniently made to all the diodes in FIGS. 5 and 6 by a conductive member 20 which, not only interconnects the cathodes of the diodes, but also functions as a heat sink.

Figure 5:
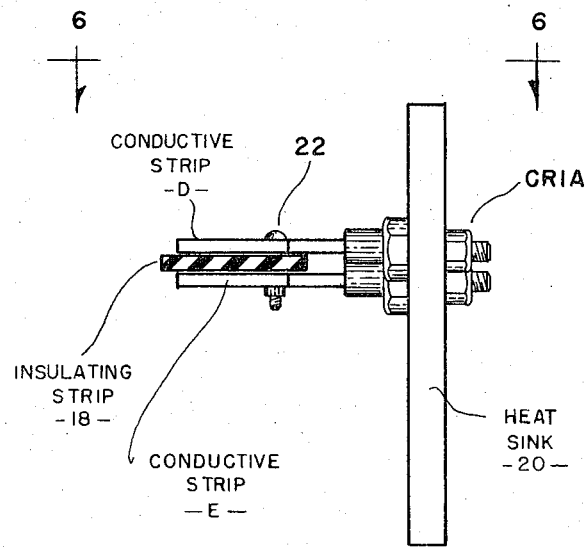
FIG. 5 is an end view of a mount for the rectifying diodes in the secondary circuit.
Figure 6:
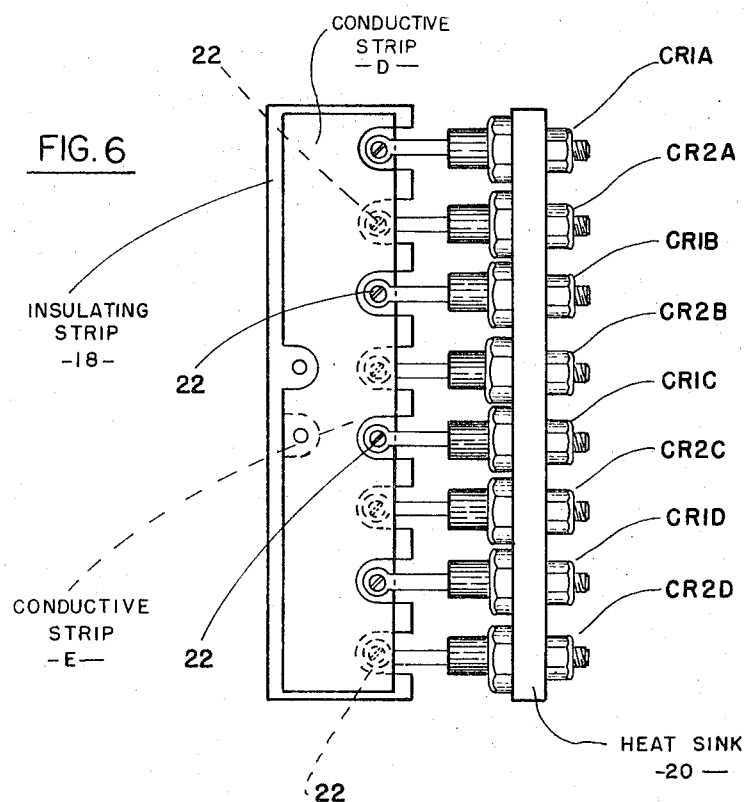
FIG. 6 is a plan view of the representation of FIG. 5, taken along the line 6—6 of FIG. 5.

The conductive strips D and E which make up the interconnection bus between the secondary of the transformer $T_1$ and the anodes of the diodes of FIGS. 5 and 6 are mounted on either side of the insulating strip 18. The conductive strips may, for example, be bonded by epoxy, or other means, to the opposite sides of the insulating strip. The conductive strips are shaped so that the notches in one strip lines up with the holes in the other strip so as to provide a connection means to the anodes of the diodes.

As shown in FIGS. 5 and 6, the various anodes are attached and connected to the conductive strips by screws 22, and the assembly is such that all the anodes of the first group of diodes are connected to the conductive strip E. Then, and as shown in FIG. 7, the conductive strips A and B are electrically connected to the conductive strips D and E respectively by screws 24a and 24b.

Figure 7:
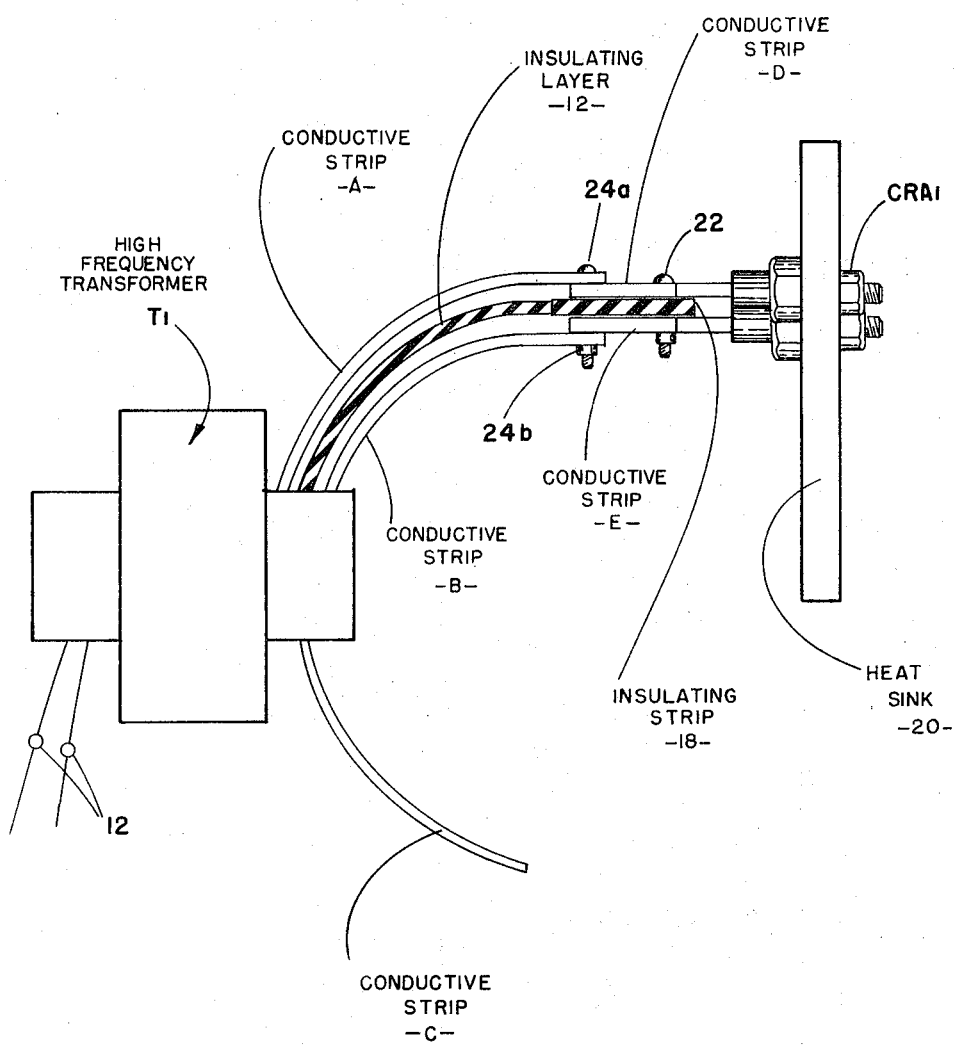
FIG. 7 is a side elevation showing the connections between the transformer and the diodes, in accordance with the concepts of the invention.

Although the conductive strips A and B are shown separated in FIG. 7 for purposes of clarity, it will be understood that the strips are closely adjacent one another and separated and insulated from each other by the thickness of the insulating layer 12. In the circuit of FIG. 7, the conductive heat sink 20 then becomes the connection to the choke coil $L_1$ of FIG. 1, and the conductive strip C becomes the connection to the other side of the direct current load 11.

Since the pulsating current does not occur in the output portion of the secondary circuit of FIG. 1, the leakage reactance in the output portion presents no particular problem.

The invention provides, therefore, an improved structure which is simple and economical to construct, and which serves to minimize leakage reactance in the secondary circuit of a power inverter system.

While a particular embodiment of the invention has been shown and described, modifications may be made. It is intended in the claims to cover the modifications which come within the spirit and scope of the invention.

What is claimed is:

1. In a power inverter system, or the like, which includes a transformer and a secondary circuit for rectifying voltage from said transformer, a structure for minimizing leakage reactance in said secondary circuit comprising: a conductive strip coiled to form a secondary winding for said transformer with the individual turns of the secondary winding being disposed closely adjacent to one another, said conductive strip having a pair of end portions connected to the respective sides of the secondary winding and disposed closely adjacent to one another to constitute elongated strip-like terminals for the secondary winding; a plurality of rectifying diodes; a first conductive member forming a common connection to said diodes; and a bus assembly interconnecting said diodes with said elongated strip-like terminals of said conductive strip forming said secondary winding, said bus assembly including a conductive strip connected to one of said strip-like terminals, and a further conductive strip connected to the other of said strip-like terminals, the two conductive strips of the bus assembly being disposed closely adjacent to one another.

2. The structure defined in claim 1, in which said conductive strip forming said secondary winding further has an additional portion connected to the center tap of the secondary winding and extending as an alongated strip-like center tap terminal for the secondary winding.

3. The structure defined in claim 1, and which includes an insulating strip interposed between said end portions of said conductive strip forming said secondary winding and between individual coils of the secondary winding formed by said conductive strip.

4. The structure defined in claim 2, in which said conductive strip of said secondary winding and said end portions and said additional portion thereof are formed of a single piece of stamped or cut conductive material.

5. The structure defined in claim 1, in which said conductive strips of the bus assembly have edge notches and holes therein positioned adjacent to one another to permit the diodes to be connected to one or the other of such strips, and which includes an insulating strip interposed between the conductive strips of the bus assembly having edge notches aligned with the holes and notches in such conductive strips.

* * * * *